United States Patent
Wright et al.

(10) Patent No.: US 11,146,450 B2
(45) Date of Patent: *Oct. 12, 2021

(54) STATE-BASED ENTITY BEHAVIOR ANALYSIS

(71) Applicant: Webroot Inc., Broomfield, CO (US)

(72) Inventors: William Wright, Scotts Valley, CA (US); Bin Qiu, Temecula, CA (US); Thomas Caldwell, San Diego, CA (US)

(73) Assignee: Webroot Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,130

(22) Filed: Feb. 7, 2020

(65) Prior Publication Data
US 2020/0177453 A1 Jun. 4, 2020

Related U.S. Application Data

(63) Continuation of application No. 15/713,043, filed on Sep. 22, 2017, now Pat. No. 10,560,326.

(51) Int. Cl.
*G06F 15/177* (2006.01)
*H04L 12/24* (2006.01)
(Continued)

(52) U.S. Cl.
CPC ...... *H04L 41/0853* (2013.01); *H04L 41/0816* (2013.01); *H04L 41/0893* (2013.01);
(Continued)

(58) Field of Classification Search
CPC ............. H04L 41/0853; H04L 41/0816; H04L 41/0893; H04L 41/410654; H04L 41/0843; H04L 63/00; H04L 43/04
(Continued)

(56) References Cited

U.S. PATENT DOCUMENTS 6,292,828 B1 * 9/2001 Williams .............. G06F 11/328
340/3.1
6,493,755 B1 * 12/2002 Hansen ............... H04L 41/0609
709/224
(Continued)

OTHER PUBLICATIONS

Office Action issued for U.S. Appl. No. 15/713,043, dated May 2, 2019, 11 pages.

*Primary Examiner* — Thu Ha T Nguyen
(74) *Attorney, Agent, or Firm* — Sprinkle IP Law Group

(57) ABSTRACT

Examples of the present disclosure describe systems and methods for state-based entity behavior analysis. In an example, entities of a computing environment may be represented using a hierarchical entity web. In some examples, an entity may have a state associated with it, which may be modeled using a place/transition (PT) network. Events within the computing environment may be evaluated by transitions of a PT network to determine whether an entity should change state. If an entity transitions from one state to another, one or more actions may be performed, including, but not limited to, taking a remedial action, generating a recommendation, and updating the state of one or more associated entities. Thus, aspects disclosed herein may provide a high-level overview of the state of entities of a computing environment, but may also be used to view in-depth information of entities at lower levels of the hierarchical entity web.

20 Claims, 7 Drawing Sheets

(51) Int. Cl.
*H04L 29/06* (2006.01)
*H04L 12/26* (2006.01)

(52) U.S. Cl.
CPC .......... *H04L 63/00* (2013.01); *H04L 41/0654* (2013.01); *H04L 41/0843* (2013.01); *H04L 43/04* (2013.01)

(58) Field of Classification Search
USPC .................. 709/220, 221, 222, 223, 224
See application file for complete search history.

(56) References Cited

U.S. PATENT DOCUMENTS

| | | | | |
|---|---|---|---|---|
| 6,664,978 B1* | 12/2003 | Kekic | ................ | H04L 41/0213 709/203 |
| 7,197,561 B1* | 3/2007 | Lovy | ................ | H04L 41/0233 709/217 |
| 7,213,068 B1* | 5/2007 | Kohli | ................ | H04L 41/0604 709/223 |
| 7,296,194 B1* | 11/2007 | Lovy | ................ | G06F 11/0709 709/224 |
| 7,715,819 B2 | 5/2010 | Rockwell | ........... | B64D 45/0059 455/404.1 |
| 7,774,052 B2* | 8/2010 | Burton | ................ | A61B 5/7264 600/544 |
| 7,904,909 B1* | 3/2011 | Reiner | ................ | G06F 9/5061 718/104 |
| 7,940,685 B1* | 5/2011 | Breslau | ................ | H04L 43/12 370/251 |
| 8,285,827 B1* | 10/2012 | Reiner | ................ | G06F 9/50 709/223 |
| 8,291,069 B1* | 10/2012 | Phillips | ................ | G06F 17/18 709/224 |
| 8,375,244 B2* | 2/2013 | Bobak | ................ | H04L 41/0654 714/3 |
| 8,504,687 B2* | 8/2013 | Maffione | ........... | H04L 41/5009 709/224 |
| 8,613,071 B2* | 12/2013 | Day | ................ | H04L 63/0281 726/12 |
| 8,627,324 B2* | 1/2014 | Irani | ................ | G06Q 10/0631 718/102 |
| 8,745,184 B1* | 6/2014 | Barkley | ................ | H04W 4/50 709/223 |
| 8,856,319 B1* | 10/2014 | Huang | ................ | G06F 9/5077 709/224 |
| 8,918,659 B2 | 12/2014 | Tanaka | | |
| 8,924,533 B2* | 12/2014 | Adams, Jr. | ........... | H04Q 3/0075 709/224 |
| 8,966,074 B1* | 2/2015 | Richards | ................ | H04M 15/47 709/224 |
| 9,432,255 B1* | 8/2016 | Hasan | ................ | H04L 41/0659 |
| 9,455,976 B2* | 9/2016 | Milman | ................ | H04L 67/10 |
| 1,056,032 A1 | 2/2020 | Wright et al. | | |
| 10,976,714 B2* | 4/2021 | Moss | ................ | G05B 15/02 |
| 2003/0037146 A1* | 2/2003 | O'Neill | ................ | H04L 65/1043 709/226 |
| 2006/0064486 A1* | 3/2006 | Baron | ................ | H04L 41/5019 709/224 |
| 2008/0010082 A1* | 1/2008 | Jiang | ................ | G06Q 10/067 705/7.11 |
| 2009/0083374 A1* | 3/2009 | Saint Clair | ........... | H04L 29/00 709/203 |
| 2009/0138577 A1* | 5/2009 | Casado | ................ | H04L 41/06 709/220 |
| 2012/0166642 A1* | 6/2012 | Saint Clair | ........ | H04L 12/2818 709/225 |
| 2012/0173896 A1* | 7/2012 | Tanaka | ................ | H04N 1/00896 713/300 |
| 2013/0124712 A1* | 5/2013 | Parker | ................ | H04L 41/5051 709/224 |
| 2013/0290520 A1* | 10/2013 | Noo | ................ | H04L 43/065 709/224 |
| 2013/0331137 A1* | 12/2013 | Burchill | ................ | H04W 16/14 455/501 |
| 2014/0012978 A1* | 1/2014 | Moussavian | ........... | G06Q 50/20 709/224 |
| 2014/0139347 A1* | 5/2014 | Forster | ................ | H04K 3/86 340/686.6 |
| 2014/0207950 A1* | 7/2014 | Badiee | ................ | H04L 47/2425 709/224 |
| 2014/0331322 A1* | 11/2014 | Jaroch | ................ | G06F 21/56 726/23 |
| 2015/0268947 A1* | 9/2015 | Ionescu | ................ | G06F 21/566 717/172 |
| 2016/0149849 A1* | 5/2016 | Lukacs | ................ | H04L 51/22 709/206 |
| 2016/0232116 A1* | 8/2016 | Bone | ................ | H04W 4/70 |
| 2016/0366038 A1* | 12/2016 | Fedorov | ................ | H04L 67/101 |
| 2017/0255863 A1* | 9/2017 | Anderson | ............. | G06N 7/005 |
| 2017/0359247 A1* | 12/2017 | Dixon | ................ | H04L 45/123 |
| 2018/0013768 A1* | 1/2018 | Hunt | ................ | G06F 21/552 |
| 2018/0232847 A1* | 8/2018 | Jackson | ................ | G06F 1/3293 |
| 2018/0267523 A1* | 9/2018 | Sigtermans | ........... | G03F 7/7065 |
| 2019/0007447 A1* | 1/2019 | Barnes | ................ | H04L 41/12 |
| 2019/0013948 A1* | 1/2019 | Mercuri | ................ | H04L 9/0643 |
| 2019/0097888 A1* | 3/2019 | Wright | ................ | H04L 63/00 |
| 2019/0114275 A1* | 4/2019 | Dropps | ................ | G06F 12/0862 |
| 2020/0042644 A1* | 2/2020 | Jagan | ................ | G06F 40/30 |
| 2020/0287802 A1* | 9/2020 | Singh | ................ | H04L 41/046 |
| 2020/0342333 A1* | 10/2020 | Sigtermans | ........ | G03F 7/70525 |

* cited by examiner

STATE-BASED ENTITY BEHAVIOR ANALYSIS

CROSS-REFERENCE TO RELATED APPLICATION(S)

This application is a continuation of, and claims a benefit of priority from U.S. patent application Ser. No. 15/713,043, filed Sep. 22, 2017, entitled "STATE-BASED ENTITY BEHAVIOR ANALYSIS," now U.S. Pat. No. 10,560,326, which is fully incorporated by reference herein.

BACKGROUND

Entities in a computing environment may be monitored to identify potential security issues. When a security issue is identified, a user may engage in additional monitoring or resolve the issue. However, as the number and/or the complexity of entities increases, it may become difficult or impossible to review each entity and act on every security event.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for state-based entity behavior analysis. In an example, entities of a computing environment may be represented using an entity web, wherein entities may be hierarchically arranged and associated using relationships. In some examples, an entity may have a state associated with it, wherein a state of the entity may be modeled using a place/transition (PT) network. For example, a PT network may comprise places associated with a good state, a bad state, and an unknown state. The places of the PT network may be related by one or more transitions, which may be used to evaluate an event to determine when an entity should transition between places of the PT network.

Events within the computing environment may be evaluated by one or more transitions of a PT network to determine whether an entity of the computing environment should change state. In an example, the evaluation may comprise deterministic factors, stochastic factors and/or an application of machine learning techniques. If an entity transitions from one state to another, one or more actions may be performed, including, but not limited to, taking a remedial action, generating a recommendation, and updating the state of one or more associated entities.

In examples, an entity in an entity web may be associated with multiple sub-entities, such that the state of the entity may be dependent on the state of the sub-entities. If the state of a sub-entity changes from a good state to a bad state, the state of the entity may be updated accordingly. As a result, an entity web may provide a high-level overview of the state of entities of a computing environment, but may also be used to view in-depth information of entities at lower levels of the hierarchical entity web.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
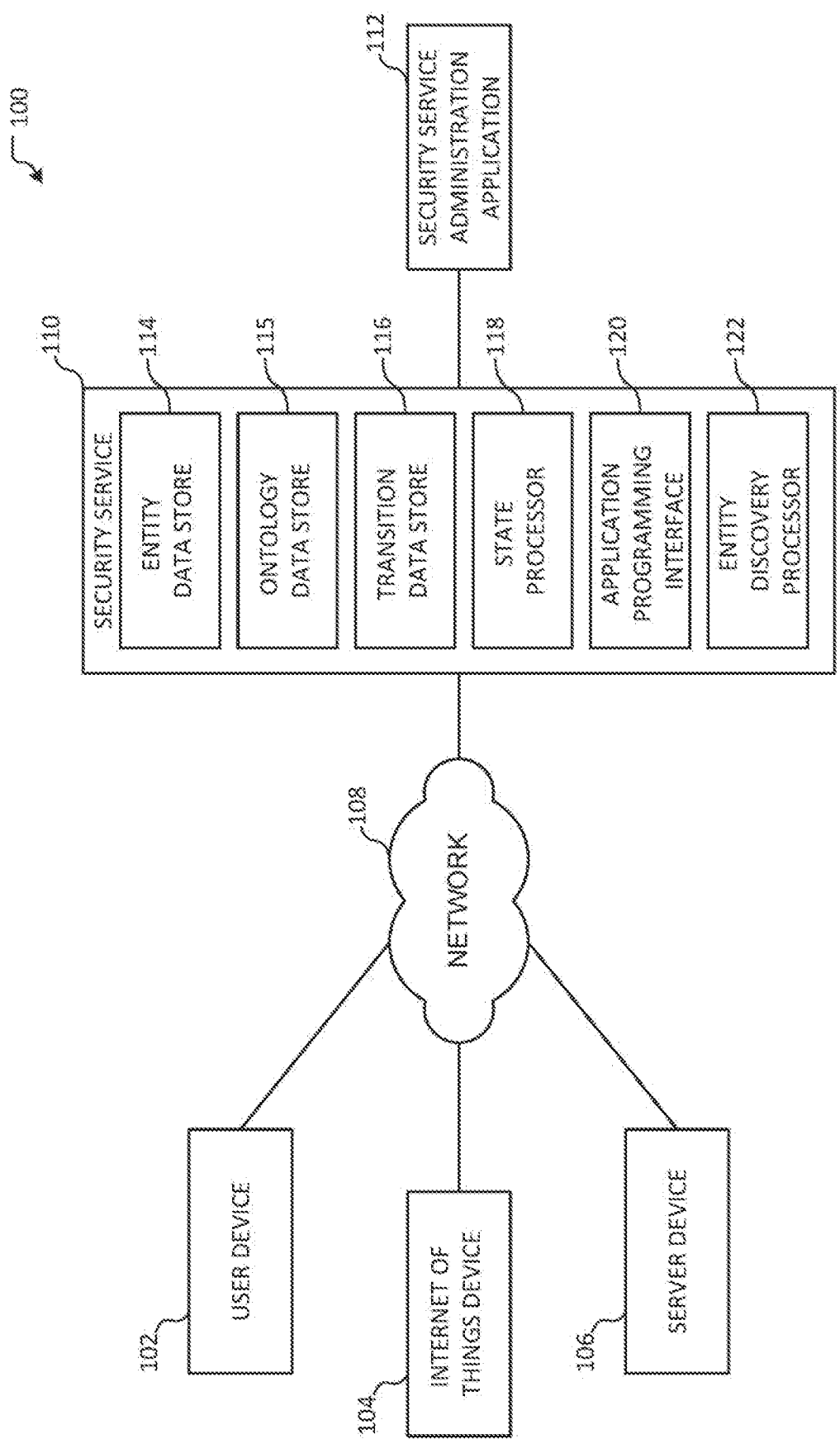
FIG. 1 illustrates an overview of an example system for state-based entity behavior analysis.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

In an example, events may occur within a computing environment, wherein an event may relate to or may affect a state of one or more entities within the computing environment. For example, an entity may be in a good state, a bad state, or an unknown state, among other states. Events may be analyzed (e.g., by a system administrator) in order to determine whether a potential security issue exists (e.g., whether an entity has changed from a good state to an unknown or bad state). However, in computing environments with a high number of complex entities, or in scenarios in which a user reviewing events may lack technical expertise or experience, it may be difficult to determine whether a security issue exists based on analyzing the event.

Accordingly, the present disclosure provides systems and methods for state-based entity behavior analysis. Entities within a computing environment may be associated by one or more relationships (e.g., a relationship may exist between a user and a device of the user or a relationship may exist between a server application and a client application, etc.). Events within the computing environment may be processed in order to determine whether the state of an entity may have changed. In an example, if the state of the entity is determined to have changed, any of a variety of actions may be taken, including, but not limited to, engaging in additional monitoring of the entity, taking a remedial action, generating a recommended action, or modifying a relationship between the entity and one or more other entities. While example actions are discussed herein, it will be appreciated that other actions may be performed.

As an example, an entity may be a computing device (e.g., an Internet of Things (IoT) device, a mobile computing device, a smartphone, a tablet computing device, a desktop or laptop computing device, a server computing device, etc.), an application (e.g., an executable application, a web-based application, a server and/or client application, a plugin or module, etc.), or a person (e.g., a user, an employee, etc.). In some examples, an entity may comprise or be associated with multiple sub-entities. As an example, a group of users and/or computing devices may be an entity. In another example, a computing device and one or more applications may be an entity. While example entities are described herein, it will be appreciated that any of a variety of other entities may be used without departing from the spirit of this disclosure. An entity may have one or more properties associated with it. Example properties include, but are not limited to, attributes (e.g., manufacturer, model number, etc.), a risk factor (e.g., a likelihood that the entity as at risk of transitioning from a good state to a bad or unknown state), and/or one or more time periods (e.g., time since last software update, manufacture date, time since last state change, time in current state, etc.).

Entities within a computing environment may be associated by one or more relationships. As an example, a trust relationship may comprise authentication information (e.g., a username, a password, a cryptographic key or signature, etc.), access control or permissions information, etc. A trust relationship may be used to manage interactions between two or more entities, thereby controlling the flow of information, the respective roles of the entities, and/or the functionality that is provided, among other examples. As another example, a relationship may exist between a user and a user computer device or between a plurality of computing devices that are communicatively connected with in a computing network.

A place/transition (PT) network may be used to model the states of an entity in a computing environment. As discussed above, example states may comprise a good state, a bad state, and/or an unknown state, among other states. In some examples, states may be customized by a user or generated programmatically, among other techniques. A PT network may be comprised of places, transitions, and arcs, such that places (e.g., states) and transitions of the PT network may be interconnected using arcs. Thus, when an entity is in a good state, the entity may be associated with a place representing the good state. A transition associated with the place (e.g., by an arc) may be used to determine whether an entity should be transitioned to a different place (e.g., an unknown state or a bad state). Upon determining that the entity should transition to a different state (e.g., as a result of an event within the computing environment), the entity may be associated with a place representing the different state. In some examples, the same or a similar PT network may be used to model the states of multiple entities within a computing environment, while in other examples different PT networks may be used. PT networks will be discussed in further detail below with respect to FIG. 3.

An event within a computing environment may be received from any of a variety of sources. In an example, an event may comprise a status indication from an entity, wherein the status indication may provide information relating to the status of the entity (e.g., whether the entity is functioning normally, statistics relating to processing load or other resource utilization, a list of active or previous users of the entity, an authentication failure, a firewall warning, etc.). In another example, an event may relate to one or more entities of the computing environment, or may relate more generally to a subpart of the computing environment. For example, an event may be generated by an edge router when a potential intrusion is detected. The generated event may provide an indication of a potential security issue relating to the edge router, and/or one or more entities that are connected to the edge router. In some examples, events may be generated based on information that is requested or received from an entity (e.g., entities may be periodically scanned or otherwise accessed, etc.). In other examples, an event may be received via an application programming interface (API) which may be used by a device or application. In another example, an event may be time-based, wherein an event may indicate that an entity has been in a state for a certain period of time or has reached a certain age, among other examples. While example events are disclosed, it will be appreciated that other events may be processed according to aspects disclosed herein.

A transition within a PT network may comprise an evaluation based on deterministic factors (e.g., Boolean logic, pattern matching, etc.), stochastic factors (e.g., historic statistical distributions, conditional probabilities, probabilistic models, etc.), numeric algorithms, time series models, controller models, pure algebraic math models, or machine learning (e.g., linear and/or nonlinear models, etc.), or any combination thereof. In some examples, a transition may comprise computer-executable code. It will be appreciated that other evaluation techniques may be used according to aspects disclosed herein. In an example, a transition may evaluate an event based on information associated with the event or may use additional information, including, but not limited to, information associated with an entity (e.g., historical entity information, entity attributes, entity relationships, etc.) or information associated with at least a subpart of the computing environment (e.g., related entities, similar entities, historical information, etc.), among other information. For example, a set of historical events may be evaluated (e.g., as a time sequence, as an unordered or sorted compilation, etc.) for a given time window. The set of events may be analyzed in the context of an entity in order to determine whether a state change occurred. In other examples, historical state changes may be evaluated, or additional information may be received or requested from a user, which may be used either alone or in combination with other information. As an example, a transition may request user input when determining whether an entity has changed state, such that the input may later be referenced when evaluating a similar scenario in the future. In another example, information may be received via an API or user interface, among other sources.

In an example, a problem domain ontology may be evaluated, which may contain possibilities, constraints, and/or properties for entities or classes of entities within the computing environment. Example properties include, but are not limited to, a manufacturer name, one or more supported protocols, one or more sensor types, hardware or software revisions, etc. In another example, the problem domain ontology may comprise information relating to how entities of the computing environment are interrelated or may comprise a list of potential failure modes. As such, information from the problem domain ontology may be used to determine a frame of reference from which an entity may be evaluated.

In examples, transitions may be predefined, may be determined or generated dynamically, or may be user-defined, or any combination thereof. In an example, multiple transitions may evaluate information to determine whether a transition should occur. In some examples, the transitions may share information and use the shared information when performing their respective evaluations. It will be appreciated that the multiple transitions may each determine that a state change should occur, should not occur, or any combination thereof. For example, a first transition may determine that an entity should change states within the PT network of the first transition, while a second transition may determine that the entity should remain in the same state for the PT network of the second transition.

As a result of an entity transitioning from one state to another state, one or more relationships of the entity may be modified. As an example, if an entity is determined to have changed from a good state to a bad state, a trust relationship may be modified so as to limit the amount of or the security with which information is shared between the entity and one or more other entities. In another example, the entity may be quarantined, such that access to one or more other related entities may be restricted. In some examples, the entity may undergo additional monitoring, wherein events associated with the entity may be subject to additional or different processing. In an example, remedial action may be taken, such as restoring the state of the entity from a previous snapshot or backup or performing a malware scan of the entity, among other actions. In another example, a recommended action may be provided to a user, wherein the recommended action may comprise an indication regarding actions to take in order to remedy the current state of the entity.

In examples, a reason may be generated when an entity changes state, which may be associated with the entity or otherwise stored. The reason may be part of a journal or log, which may provide a history for one or more entities. In an example, one or more records may be analyzed by a transition when determining whether an entity has changed or should change states according to aspects disclosed herein (e.g., as historical entity information, as information for a related entity, etc.). In another example, one or more records may be analyzed when determining an action to perform as a result of an entity changing states, such that the action may be based on historical information relating to the entity.

In some examples, a computing environment may be structured hierarchically, which may be referred to herein as an "entity web." In an entity web, relationships may exist between levels of the hierarchy, or, in some examples, an entity may exist at a higher level that represents or is associated with one or more entities at a lower level. As an example, entities of different divisions of a company may be at a first level of the entity web, while the second level (e.g., the next highest level) of the hierarchy may be comprised of entities that represent the different divisions (e.g., division entities). As described above, entity states may be modeled using one or more PT networks. In some examples, the state of an entity at a higher level of an entity web may be determined based on one or more entities at a lower level. For example, the state of a division entity may be determined based on the states of one or more entities with which the division entity is associated (e.g., entities for the division in the first level of the entity web). In some examples, the determination may comprise weighting entity states, averaging entity states, performing a historical analysis, and/or evaluating user-specified logic, among other techniques. In other examples, a security index score may be generated for an entity at a higher level of the hierarchy based on states associated with entities at lower levels of the hierarchy. For example, a security index score may be determined based on historical entity states, current entity states, likelihood of entity state changes, operational value of entities, and/or likelihood that the current state of an entity is incorrect. Other factors may be used to generate a security index score.

It will be appreciated that while example entity web structures are described herein, a computing environment may be organized using any of a variety of structures without departing from the spirit of this disclosure. In examples, an entity web may be used to generate a high-level overview of multiple lower-level entities, which may make complex state information more easily accessible and actionable than it otherwise would be. In such examples, lower levels of the hierarchy may be accessed in order to further examine the cause for the current state of higher-level entities.

FIG. 1 illustrates an overview of an example system 100 for state-based entity behavior analysis. As illustrated, system 100 is comprised of user device 102, internet of things (IoT) device 104, server device 106, network 108, security service 110, and security service administrative application 112. In an example, devices 102-106 may communicate using network 108. As an example, devices 102-106 may communicate using wired and/or wireless connections to network 108. In some examples, devices 102-106 may be entities of system 100 according to aspects disclosed herein.

User device 102 may be any of a variety of devices, including, but not limited to, a mobile computing device, a tablet computing device, a smartphone, a laptop computing device, or a desktop computing device. IoT device 104 may be any of a wide array of "smart" devices, including, but not limited to, connected appliances, entertainment devices, or wearable devices. In some examples, a user may use an application on user device 102 to interact with IoT device 104. Server device 106 may be a computing device, or may be a distributed computing device. In some examples, server device 106 may store data accessed by and/or generated by IoT device 104 and/or user device 102. While example devices are described, it will be appreciated that any other device may be used according to aspects disclosed herein.

Security service 110 may monitor and/or analyze the status of devices 102-106. As illustrated, security service 110 comprises entity data store 114, ontology data store 115, transition data store 116, state processor 118, application programming interface (API) 120, and entity discovery processor 122. In some examples, security service 110 may be a computing device, or may be multiple computing devices. In other examples, the functionality discussed herein with respect to one or more of components 114-122 may be distributed among other devices of system 100 (e.g., devices 102-106). In an example, at least some aspects of security service 110 may be local to devices 102-106 (e.g., on the same local network, provided using the same computing resources, etc.). In another example, at least some aspects of security service 110 may be remote (e.g., provided by a remote data center, as a cloud service, etc.).

Entity data store 114 may comprise information relating to entities of system 100 (e.g., devices 102-106). In some examples, entity data store 114 may comprise a local data store and/or a remote data store. Entity data store 114 may store one or more relationships associated with the stored entities, according to aspects disclosed herein. As an example, entity data store 114 may store a relationship between user device 102 and IoT device 104, which may indicate that user device 102 may interact with IoT device 104 (e.g., via network 108). In another example, entity data store 114 may store a relationship between user device 102 and server device 106, which may indicate that user device 102 accesses information from or stores information on server device 106. In some examples, the relationship may be a trust relationship (e.g., such that the relationship may indicate the access permissions of user device 102 when accessing server device 106). As described above, entity data store 114 may comprise an entity web, wherein entities may be hierarchically organized. As an example, IoT device 104 and server device 106 may comprise an "infrastructure level" of the entity web, while user device 102 may comprise a "user device level." Thus, states of IoT device 104 and server device 106 may be used to determine a state for the infrastructure level, while the state of user device 102 may be used to determine the state of the user device level.

Ontology data store 115 may store one or more problem domain ontologies according to aspects disclosed herein, which may relate to entities or classes of entities of system 100. For example, ontology data store 115 may comprise information relating to properties for one or more IoT devices, user devices, and/or server devices, such as IoT device 104, user device 102, and server device 106. For example, ontology data store 115 may comprise one or more roles for users of a user device, applications which may be used to communicate among entities (e.g., an application that may execute on user device 102 to interact with IoT device 104), or other information. In some examples, information from ontology data store 115 may be evaluated when determining a state for an entity in order to perform the evaluation from a relevant frame of reference. In other examples, information within ontology data store 115 may change, which may cause a state change to occur according to aspects disclosed herein. While example problem domain ontology information is discussed, it will be appreciated that ontology data store 115 may store any of a variety of other additional and/or alternative ontology information.

In examples, entity data store 114 may store one or more states for entities stored by entity data store 114. For example, each of devices 102-106 may be in a good state. In some examples, entity data store 114 may store historical state information associated with devices 102-106, among other entity attributes and/or computing environment information. As described herein, one or more PT networks may be used to model the states of entities stored by entity data store 114. Accordingly, transition data store 116 may store information relating to one or more PT networks. In an example, transitions and/or PT networks in transition data store 116 may be pre-defined, user-defined, and/or determined programmatically, among other examples.

As an example, a transition stored by transition data store 116 may comprise an evaluation based on deterministic factors (e.g., Boolean logic, pattern matching, etc.), stochastic factors (e.g., historic statistical distributions, conditional probabilities, probabilistic models, etc.), or machine learning, or any combination thereof. In some examples, a transition may comprise computer-executable code (e.g., written in JavaScript, Python, C++, etc.). Transitions in transition data store 116 may be used by state processor 118 to determine whether an entity should transition to a new state. In an example, state processor 118 may evaluate an event based on information associated with the event or may use additional information, including, but not limited to, information stored by entity data store 114 and/or ontology data store 115, such as information associated with one or more of devices 102-106 (e.g., historical entity information, entity attributes, entity relationships, etc.) or information associated with at least a subpart of system 100 (e.g., related entities, similar entities, historical information, etc.), among other information. In another example, state processor 118 may request user input when determining whether an entity has changed state, or may evaluate previously-received user input when evaluating a scenario similar to the scenario for which the user input was previously received.

In an example, an event may be received from one of devices 102-106. The event may comprise a status indication for the device (e.g., whether the entity is functioning normally, statistics relating to processing load or other resource utilization, a list of active or previous users of the entity, an authentication failure, a firewall warning, etc.). In another example, an event may relate to one or more entities of the computing environment, or may relate more generally to a subpart of the computing environment. For example, the event may be received from network 108 (e.g., a router, a modem, etc.). In some examples, an event may be received by API 120, which may be used by other devices and/or applications to provide events to security service 110. For example, a security application may use API 120 to provide events that are detected or generated by the security application. In other examples, entity discovery processor 122 may evaluate network 108 and/or one or more of devices 102-106 to generate events. While example events are disclosed, it will be appreciated that other events may be processed according to aspects disclosed herein.

Security service administration application 112 may be used to manage security service 110. In an example, security service administration application 112 may be used to create, modify, or remove transitions in transition data store 116. In another example, security service administration application 112 may be used to view state information of devices 102-106 (e.g., as may be stored by entity data store 114). In some examples, security service administration application 112 may access information from security service 110 using API 120. In examples, security service administration application 112 may provide a high-level state display of an entity web comprising device 102-106, as well as lower-level displays based on the hierarchical structure of the entity web. For example, security service administration application 112 may display a state for the infrastructure level of the entity web (e.g., IoT device 104 and server device 106), as well as a state for the user device level (e.g., user device 102). In an example, if the state for the infrastructure level indicates an unknown state, security service administration application 112 may be used to view states of the entities associated with the infrastructure level in order to determine the cause of the unknown state. In some examples, security service administration application 112 may provide functionality to modify an entity web (e.g., add entities and/or relationships, remove entities and/or relationships, modify entities and/or relationships, etc.). In other examples, entities may be detected automatically (e.g., by entity discovery processor 122).

Figure 2A:
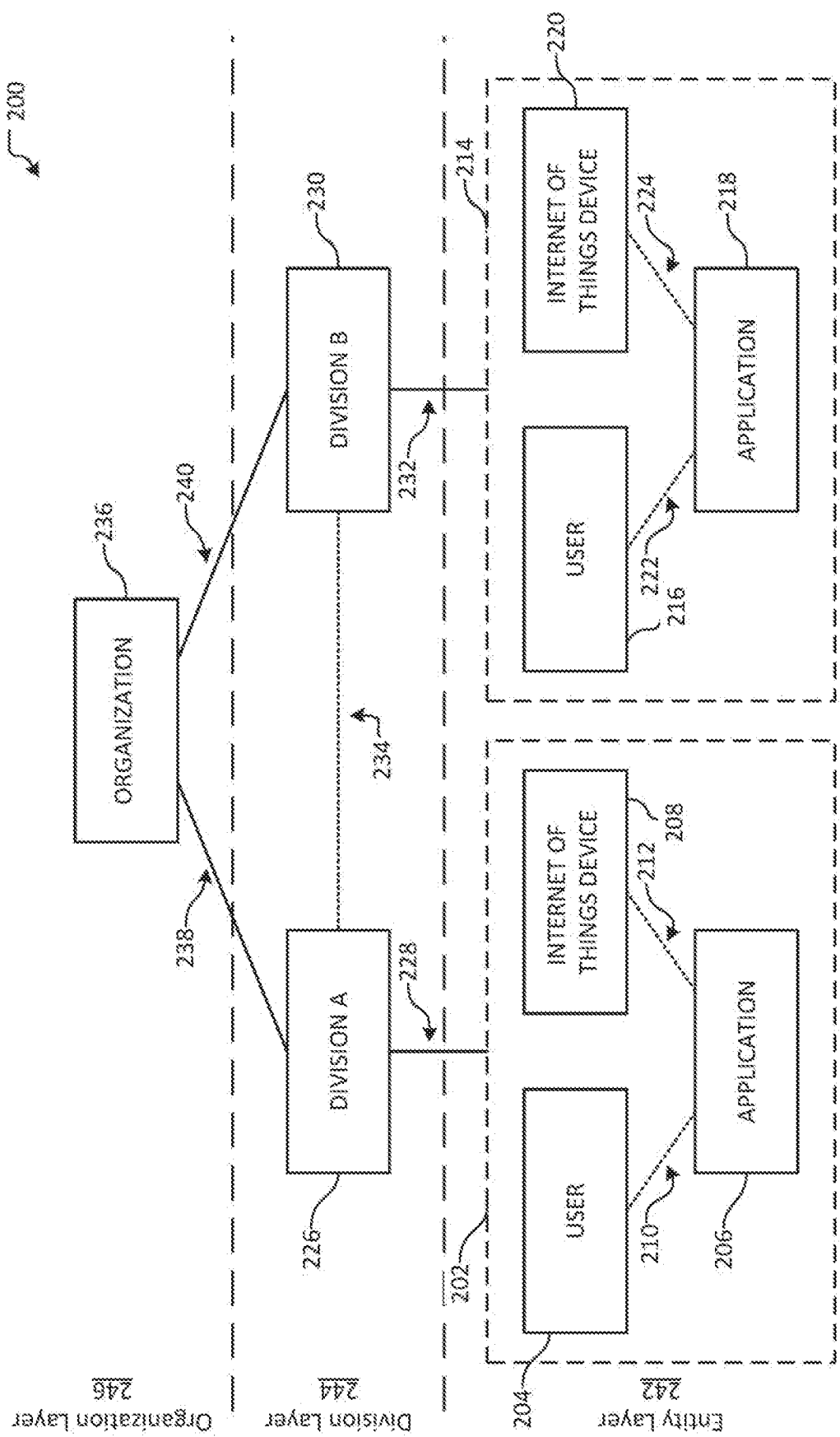
FIG. 2A illustrates an overview of an example entity web.

FIG. 2A illustrates an overview of an example entity web 200. In an example, entity web 200 may comprise entities of an organization, and may be used to determine the overall state of an organization according to aspects disclosed herein. As illustrated, entity web 200 is comprised of entity layer 242, division layer 244, and organization layer 246. Entity layer 242 is comprised of entities for Division A, as illustrated by dashed box 202, and entities for Division B, as illustrated by dashed box 214. While FIG. 2A illustrates an example simplified entity web for an organization, it will be appreciated that aspects disclosed herein may be applied to any of a variety of different domains and entity types.

Further, an entity web may represent additional, fewer, or different layers, and may comprise any number of entities. As an example, an entity web may comprise entities of a smart city, wherein entities may comprise city infrastructure, buildings, vehicles, and residents. The entity web may have various hierarchical levels associated with the different entities, such that it may be possible to view the status of the smart city (e.g., at the highest level of the hierarchy) based on its various constituent parts.

With respect to the entities for Division A in dashed box 202, entity web 200 comprises user 204, application 206, and internet of things (IoT) device 208. Relationship 210 may exist between user 204 and application 206, as illustrated by a dashed line, which may indicate that user 204 may use application 206. In some examples, relationship 210 may be a trust relationship, which may represent privileges or authentication credentials of user 204 with respect to application 206. Relationship 212 may exist between application 206 and IoT device 208, as illustrated by a dashed line. Relationship 212 may indicate that application 206 may access information from and/or interact with IoT device 208. According to aspects disclosed herein, user 204, application 206, and IoT device 208 may each be entities, and may each be associated with one or more states. In an example, the states of entities 204-208 may be modeled using one or more PT networks.

Turning now to the entities for Division B in dashed box 214, entity web 200 comprises user 216, application 218, and IoT device 220. Relationship 222 may exist between user 216 and application 218, as illustrated by a dashed line, which may indicate that user 216 may use application 218. In some examples, relationship 222 may be a trust relationship, which may represent privileges or authentication credentials of user 216 with respect to application 218. Relationship 224 may exist between application 218 and IoT device 220, as illustrated by a dashed line. Relationship 224 may indicate that application 218 may access information from and/or interact with IoT device 220. According to aspects disclosed herein, user 216, application 218, and IoT device 220 may each be entities, and may each be associated with one or more states. In an example, the states of entities 216-220 may be modeled using one or more PT networks.

As illustrated, division layer 244 is hierarchically above entity layer 242. Division layer 244 comprises Division A entity 226 and Division B entity 230. As described above, entities in an entity web may be associated with one or more sub-entities. As illustrated by association 228 between Division A entity 226 and dashed box 202, Division A entity 226 is associated with entities 204-208. Similarly, association 232 between Division B entity 230 and dashed box 214 may indicate that Division B entity 230 is associated with entities 216-220. Thus, according to aspects herein, one or more states of entities 204-208 may be used to determine a state for Division A entity 226, while one or more states of entities 216-220 may be used to determine a state for Division B entity 230. In some examples, a security index score may be generated for each of Division A entity 226 and Division B entity 230 based on their respective sub-entities, according to aspects disclosed herein.

Relationship 234 is illustrated as a dashed line between Division A entity 226 and Division B entity 230. In an example, relationship 234 may comprise a trust relationship between Division A entity 226 and Division B entity 230. In some examples, relationship 234 may be associated with the sharing of information or resources between Division A and Division B, such that relationship 234 may control the sensitivity and/or type of information that may be shared between Division A and Division B.

At organization layer 246, organization entity 236 is illustrated as being associated with Division A entity 226 and Division B entity 230 by associations 238 and 240. Thus, according to aspects disclosed herein, the state of organization entity 236 may be determined based on Division A entity 226 and Division B entity 230. As an example, if Division A entity 226 and Division B entity 230 are both in a good state, organization entity 236 may also be in a good state. In another example, if Division A entity 226 is in a bad or unknown state, while Division B 230 is in a good state, the state of organization entity 236 may reflect the state of Division A entity 226. In some examples, a security index score may be generated for organization entity 236 based on the security index scores for Division A entity 226 and Division B entity 230.

In some examples, an event may be received as described above. Based on the event, it may be determined (e.g., by state processor 118 in FIG. 1) that IoT device 208 should be transitioned to a bad state. Accordingly, the state of IoT device 208 may be updated to reflect a bad state. In an example, aspects of relationships 210 and/or 212 may be updated as a result of IoT device 208 changing states. For example, relationship 212 may be updated to indicate that less information should be accessible to IoT device 208. In other examples, IoT device 208 may undergo additional monitoring, remedial action may be taken (e.g., restoring IoT device 208 using a backup, resetting authentication credentials, etc.), or a recommendation may be provided (e.g., it may be recommended that IoT device 208 be replaced, reset, etc.). It will be appreciated that other actions may be taken.

As a result of IoT device 208 changing state, the state of Division A entity 226 may be updated as well. In some examples, the state of Division A entity 226 may be updated based on the event, based on the state of IoT device 208, based on the states of user 204 and application 206, or based on historical information, or any combination thereof. In other examples, other information, factors, logic, or techniques may be used. For example, the state of Division A entity 226 may be updated to also be in a bad state, as a result of an entity (e.g., IoT device 208) associated with Division A entity 226 being in a bad state. In some examples, this may cause relationship 234 to be updated. As an example, relationship 234 may be updated to indicate that one or more entities of Division A is in a bad state and, as a result, sensitive information should not be shared by Division B with Division A. In another example, relationship 234 may be removed or suspended, such that Division A may be quarantined from Division B. It will be appreciated that other actions may be taken.

The state of organization entity 236 may also be updated to reflect the changed states of Division A entity 226 and IoT device 208. As an example, organization entity 236 may be transitioned to a bad state, thereby indicating that one or more sub-entities (e.g., division A entity 226) is in a bad state. As a result, a user may view entity web 200 at organization layer 246 to determine, at-a-glance, that organization entity 236 is in a bad state. In some examples, the user may use security service administration application 112 in FIG. 1. Upon determining that organization entity 236 is in a bad state, the user may further examine entity web 200 to determine the cause of the transition of organization entity 236 from a good state to a bad state. In an example, the user may inspect entities at division layer 244 (e.g., sub-entities of organization entity 236), where it may be determined that Division A entity 226 is in a bad state.

Accordingly, sub-entities of Division A entity 226 may be inspected, where it may be determined that IoT device 208 is the root cause of organization entity 236 and Division A entity 226 being in a bad state. As discussed above, one or more recommendations may be provided, thereby enabling the user to take action in order to correct the state of IoT device 208. In some examples, the user may indicate that remedial action should be automatically taken. In other examples, historical data and/or statistics may be presented to the user, such as uptime statistics, historical state transition information, etc.

Figure 2B:
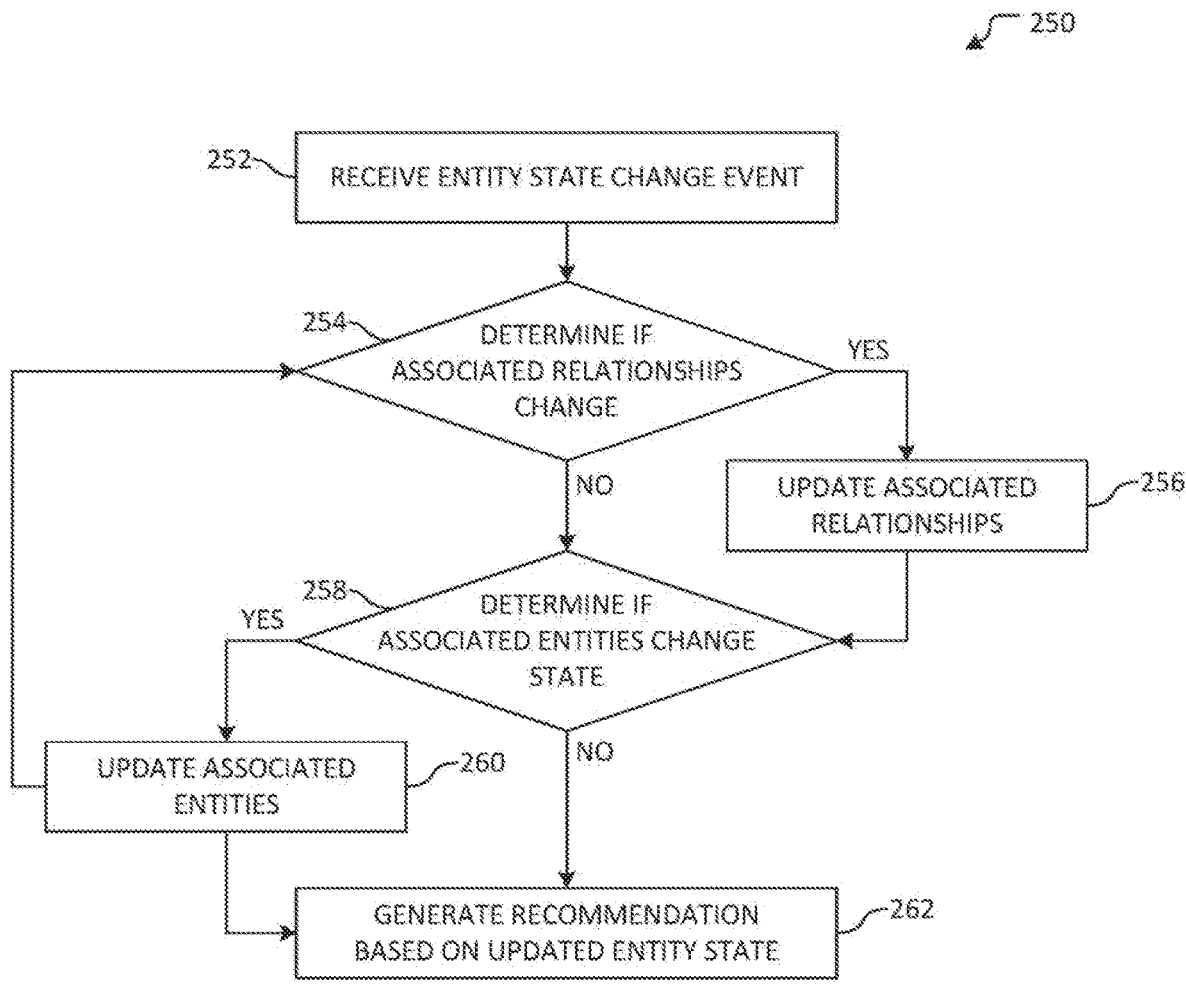
FIG. 2B illustrates an overview of an example method for propagating an entity state change in an example entity web.

FIG. 2B illustrates an overview of an example method 250 for propagating an entity state change in an example entity web. In an example, method 250 may be performed by a computing device or may be performed by state processor 118 in FIG. 1. Method 250 begins at operation 252, where an entity state change event may be received. In an example, the entity state change event may be received as a result of an entity transitioning to a different state based on an event, according to aspects disclosed herein. For example, an entity state change event may be received for IoT device 208 when IoT device 208 transitions to a bad state as was discussed above with respect to FIG. 2A.

At determination 254, it may be determined whether relationships associated with the entity change. The determination may comprise evaluating one or more relationships associated with the entity in an entity web. For example, with reference to IoT device 208 in FIG. 2A, relationships 210 and/or 212 may be evaluated in order to determine whether the relationships should be updated or removed. In some examples, the determination may comprise determining whether new relationships should be created or if existing relationships should be removed. If it is determined that one or more relationships associated with the entity change, flow branches "YES" to operation 256, where one or more relationships associated with the entity may be updated according to aspects disclosed herein. Flow continues to determination 258, which is discussed below.

If, however, it is determined that associated relationships do not change, flow branches "NO" to determination 258. At determination 258, it may be determined whether one or more entities associated with the entity should change state. For example, the determination may comprise evaluating entities in an entity web that are associated with the entity by one or more relationships. With reference to FIG. 2A, entities 204, 206, and 226 may be evaluated as a result of their association with IoT device 208. If it is determined that one or more entities should be updated, flow branches "YES" to operation 260, where the state of one or more associated entities may be updated according to aspects disclosed herein. In some examples, updating the entities may cause operations similar to those discussed with respect to method 250 to be performed (e.g., due to a resulting entity state change event). In other examples, flow may loop from operation 260 through operations 254-258 in order to further propagate the entity state change through an entity web, as illustrated by the arrow between operations 260 and 254. Eventually flow may progress to operation 262, which is discussed below.

If, however, it is determined that associated entities do not change state, flow branches "NO" to operation 262. At operation 262, a recommendation may be generated based on the updated entity state. In an example, the recommendation may relate to the entity for which the state change event was received at operation 252, while recommendations for entities that changed state as a result of the entity state change event (e.g., at operation 260) may be generated later or by another method or process. In some examples, the recommendation may relate to multiple entities (e.g., as may be the case when multiple entities change state by way of operation 260) or multiple recommendations may be generated. In other examples, it may be determined that multiple entities changed state as a result of method 250, but a subset of entities were responsible for the propagating state changes. As a result, the recommendation may relate to the responsible entities. As an example, IoT device 208 discussed above with respect to FIG. 2A was responsible for the state changes that propagated through entity web 200. Accordingly, a recommendation may be generated with respect to IoT device 208 in order to remedy the state changes of other related entities. Flow terminates at operation 262.

Figure 3:
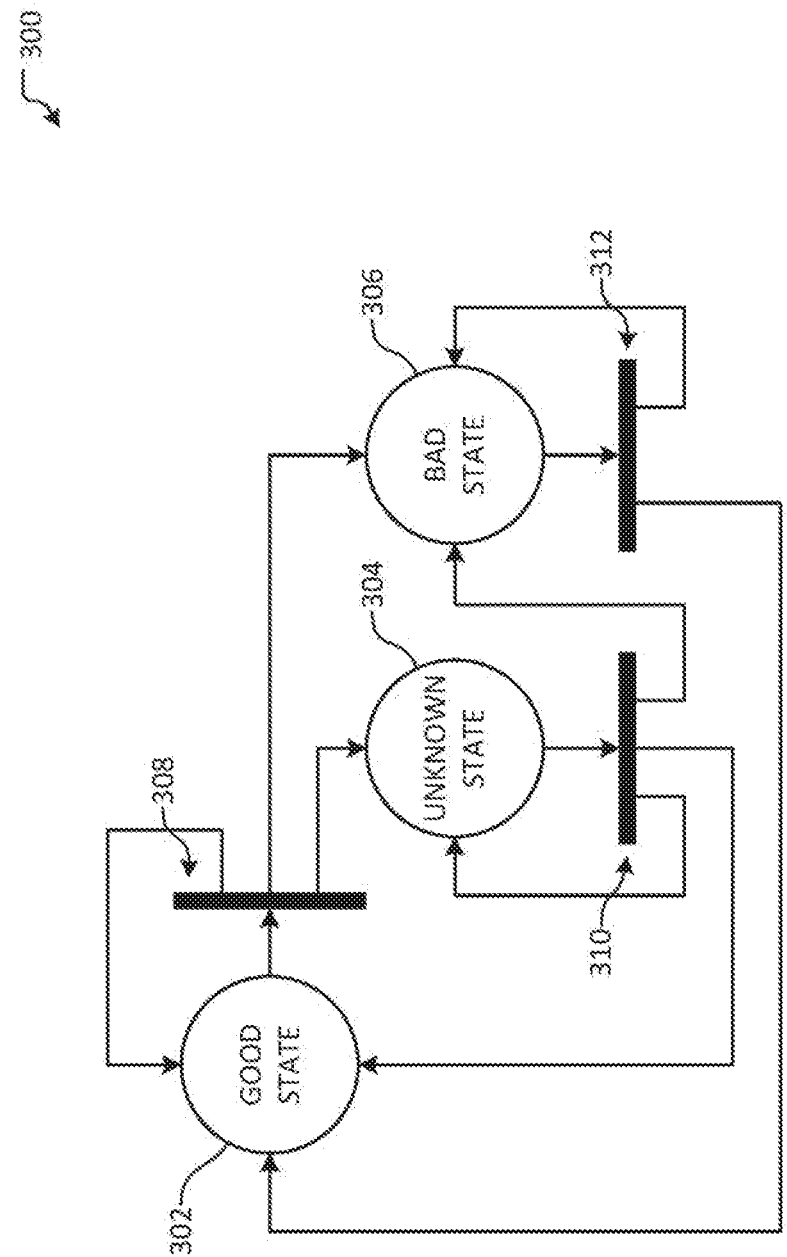
FIG. 3 illustrates an overview of an example place/transition network.

FIG. 3 illustrates an overview of an example place/transition (PT) network 300. In some examples, PT network 300 may be used to model state changes of entities in an entity web (e.g., devices 102-106 in FIG. 1, or entities 204-208, 216-220, 226, 230, and/or 236 in FIG. 2A). As illustrated, PT network 300 is comprised of places 302, 304, and 306. Place 302 may indicate a good state, place 304 may indicate an unknown state, and place 306 may indicate a bad state. In examples, places or states may be pre-defined, user-defined, or dynamically defined, among other techniques. It will be appreciated that a PT network may have additional, fewer, or different places.

Transitions 308, 310, and 312 may be used to determine whether an entity should transition from one place to another place. Transitions 308, 310, and 312 may comprise an evaluation based on deterministic factors (e.g., Boolean logic, pattern matching, etc.), stochastic factors (e.g., historic statistical distributions, conditional probabilities, probabilistic models, etc.), numeric algorithms, time series models, controller models, pure algebraic math models, or machine learning (linear and/or nonlinear models, etc.), or any combination thereof. In some examples, a transition may comprise computer-executable code. It will be appreciated that other evaluation techniques may be used according to aspects disclosed herein. In an example, a transition may evaluate an event based on information associated with the event or may use additional information, including, but not limited to, information associated with an entity (e.g., historical entity or state change information, entity attributes, entity relationships, etc.) or information associated with at least a subpart of the computing environment (e.g., related entities, similar entities, historical information, etc.), among other information. In another example, a transition may evaluate information from a problem domain ontology and/or information received as user input, according to aspects disclosed herein. In examples, transitions may be predefined, may be determined or generated dynamically, or may be user-defined, or any combination thereof. In another example, a PT network may have additional, fewer, or different transitions.

As an example, an event may be analyzed using PT network 300. An entity may initially be associated with place 302, thereby indicating that the entity is in a good state. Transition 308 may evaluate the event according to aspects disclosed herein, in order to determine whether the entity should remain at place 302 (e.g., as illustrated by the arrow from transition 308 to place 302), or should transition to another place (e.g., the arrows from transition 308 to places 304 and 306). If it is determined that the entity should transition to an unknown state (e.g., as a result of determining that the event indicates potentially unusual behavior), the entity may be associated with place 304.

Accordingly, a subsequent event for the entity may be evaluated by transition 310. In some examples, transition 310 may comprise a similar evaluation to transition 308, or may be different. As an example, transition 310 may comprise additional scrutiny or analysis in order to determine with more certainty whether the entity is actually in a bad state or whether the entity should be returned to a good state. In some examples, it may be determined that the entity should remain in an unknown state, as indicated by the arrow from transition 310 to place 304. If it is determined that the entity is in a bad state, the entity may be transitioned to place 306, thereby indicating that the entity is associated with a bad state.

Thus, a subsequent event for the entity may be evaluated using transition 312. In some examples, transition 312 may comprise a similar evaluation to transitions 308 and/or 310, or may be different. As an example, transition 312 may comprise additional or different scrutiny or analysis in order to determine with more certainty whether the entity is actually in a bad state or whether the entity should be returned to a good state. In some examples, transition 312 may comprise taking remedial action in order to attempt to resolve the bad state of the entity. If the remedial action is unsuccessful, the entity may remain in a bad state and may remain at place 306. If, however, the remedial action is successful or another event indicates that the state of the entity has improved, the entity may be transitioned from place 306 to place 302 by transition 312, thereby associating the entity with a good state.

In some examples, additional transitions may occur as a result of an evaluation performed by one of transitions 308, 310, and 312. As an example, other entities may be transitioned within an entity web, or other specialized transitions may be used to further evaluate an event and/or the state of an entity. In some examples, a determination by a transition may cause additional processing to occur, such as attempting to remedy a perceived bad state, generating one or more recommendations, or altering relationships between a plurality of entities. It will be appreciated that other actions, transitions, or processes may be used without departing from the spirit of this disclosure.

Figure 4A:
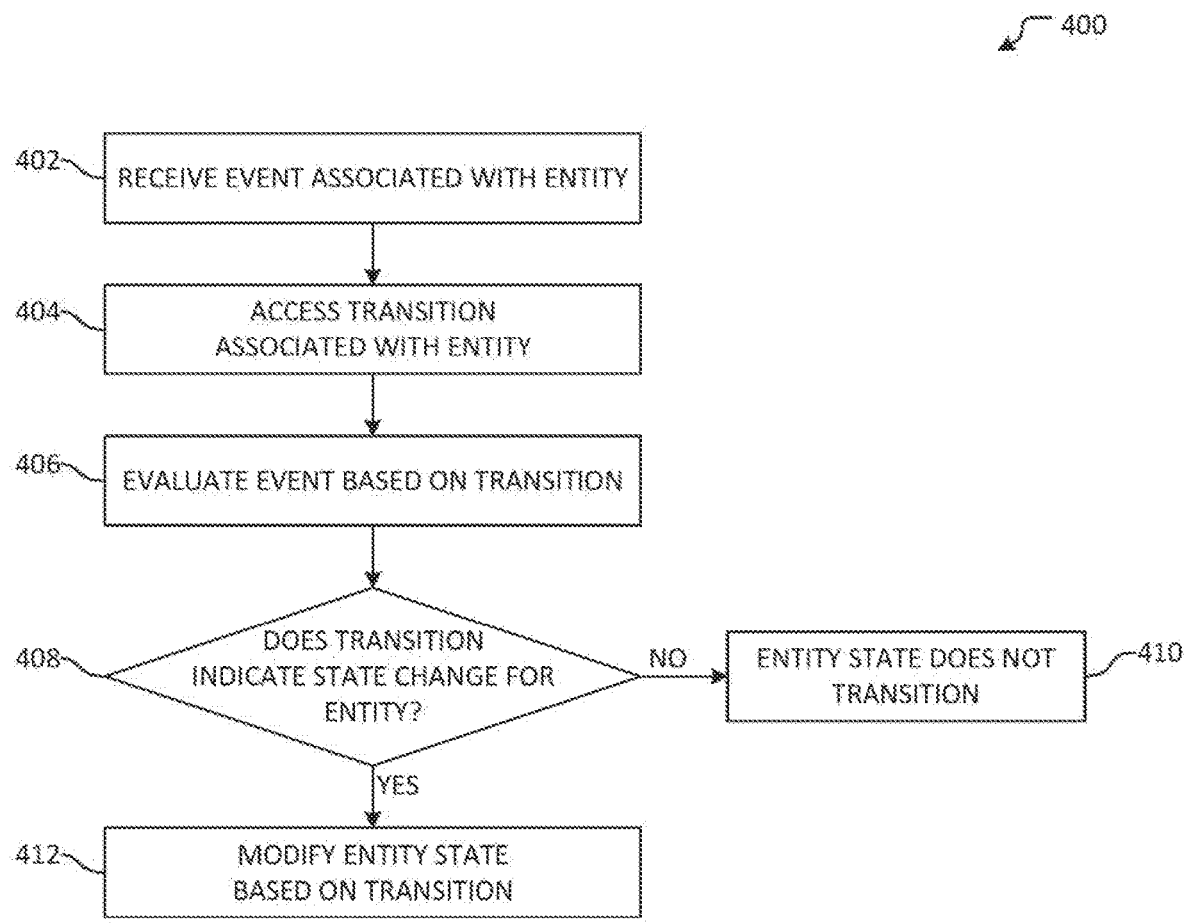
FIG. 4A illustrates an overview of an example method for processing an event associated with an entity.

FIG. 4A illustrates an overview of an example method 400 for processing an event associated with an entity. In an example, method 400 may be performed by a computing device or may be performed by state processor 118 in FIG. 1. Method 400 begins at operation 402, where an event associated with an entity may be received. In an example, the event may be generated by the entity or another entity of a computing environment. In some examples, the event may be received via an API (e.g., API 120 in FIG. 1), as a result of requesting information from an entity, or periodically polling entities of the computing environment (e.g., by entity discovery processor 122 in FIG. 1), among other sources At operation 404, a transition associated with the entity may be accessed. In some examples, this may comprise determining a place with which the entity is associated (e.g., a place associated with a good, a bad, or an unknown state, etc.) and identifying one or more transitions associated with the determined place. In an example, the transition may be accessed from a transition data store, such as transition data store 116 in FIG. 1. In another example, a transition may be determined based on the event or an entity to which the event relates, among other factors. As discussed above, the transition may be a pre-defined transition, a user-defined transition, or a dynamically generated transition, among other transitions. While method 400 is discussed with respect to a single transition, it will be appreciated that other examples may comprise evaluating multiple transitions (e.g., sequentially, simultaneously, etc.).

Flow then progresses to operation 406, where the transition may be used to evaluate the event. In an example, the evaluation may comprise an evaluation of stochastic factors. For example, a probability may be evaluated, such as a probability associated with a risk factor of an entity, a probability that an event is associated with a bad state, etc. In another example, a probabilistic model may be used to generate a probability based on an analysis of historical entity information, entity attributes, or information relating to the computing environment, among other information. In examples, the evaluation may comprise evaluating historic factors, such as historic entity state information (e.g., how long an entity has been in a given state, time since the entity's last state change, etc.), historic state change information, or historic information of the computing environment. In some examples, one or more deterministic factors may be evaluated, including, but not limited to, Boolean logic, pattern matching, or an evaluation of a set of conditions or criteria. In other examples, machine learning techniques may be used to analyze the event, including, but not limited to, deep learning, supervised learning, and/or unsupervised learning. In an example, information from a problem domain ontology may be evaluated in order to determine a frame of reference from which the event may be evaluated. In another example, the evaluation may comprise evaluating information received as user input. It will be appreciated that other evaluations may be used. In an example, a combination of evaluation techniques may be used.

At determination 408, it may be determined whether the transition indicates a state change for the entity. As an example, if the evaluation comprises a stochastic evaluation, the determination may comprise evaluating a threshold. If it is determined that the transition does not indicate a state change, flow branches "NO" to operation 410, where the entity state does not transition. In some examples, even though the entity state is unchanged, information may be stored or logged based on the event, such as information generated during the transition evaluation or information associated with the event and/or entity. Flow terminates at operation 410.

If, however, it is determined at determination 408 that the transition indicates a state change for the entity, flow branches "YES" to operation 412 where the entity state may be modified. In some examples, modifying the entity state may comprise updating an attribute of the entity, changing a state of the entity (e.g., in an entity web such as entity web 200 in FIG. 2A), changing one or more relationships of the entity, and/or evaluating one or more other transitions, among other operations. In other examples, an event may be generated as a result of changing the state of the entity, such that the event may be evaluated by one or more other transitions according to aspects disclosed herein. In an example, information associated with the transition may be stored or logged, thereby enabling later auditing or analysis of the state change. For example, information generated during the transition evaluation may be stored, as well as information relating to the entity and/or event, among other information. In an example, aspects of method 420 in FIG. 4B may be performed, as will be discussed in greater detail below. Flow terminates at operation 412.

Figure 4B:
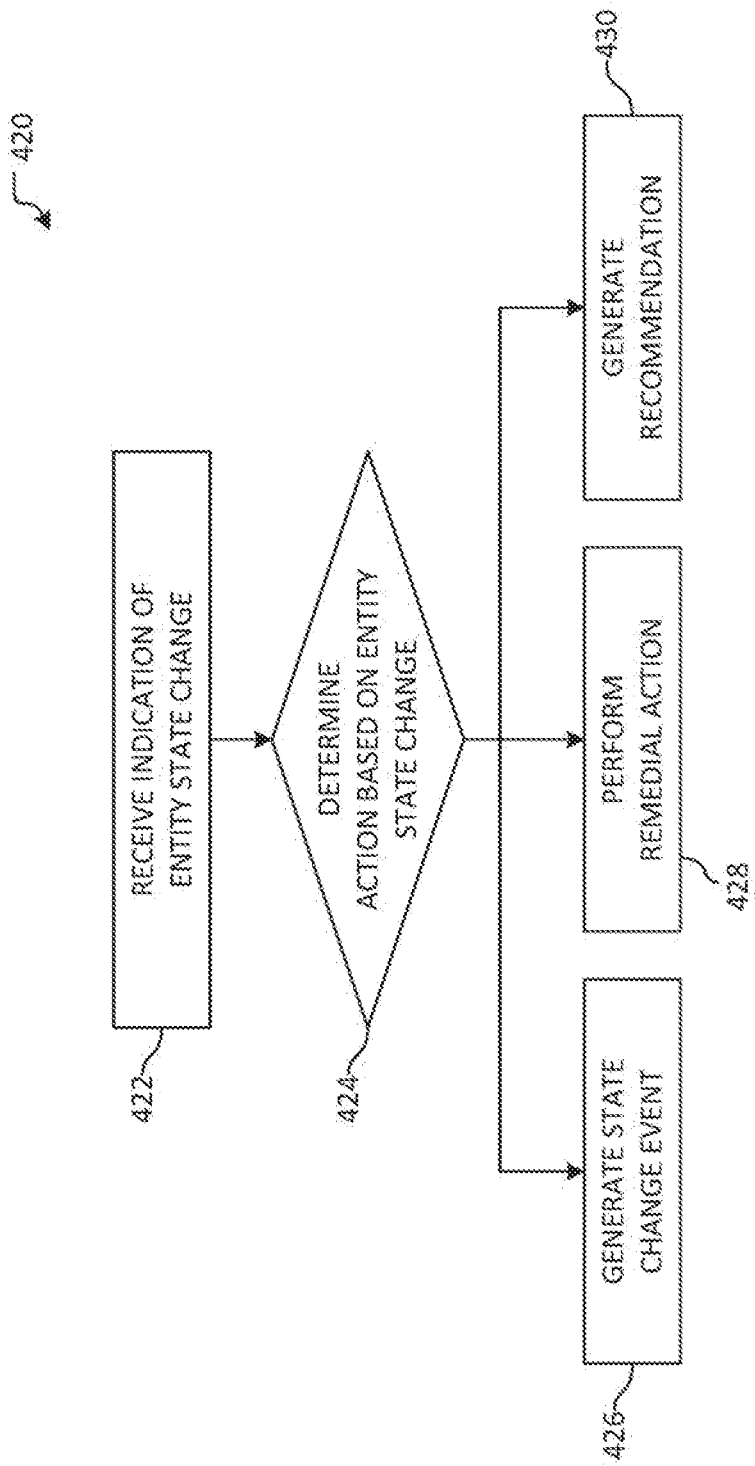
FIG. 4B illustrates an overview of an example method for updating aspects of an entity web based on an entity state change.

FIG. 4B illustrates an overview of an example method 420 for updating aspects of an entity web based on an entity state change. In an example, method 420 may be performed by a computing device or may be performed by state processor 118 in FIG. 1. Method 420 begins at operation 422, where an indication of an entity state change may be received. In an example, the indication may be received as a result of a transition of a PT network determining that the state of an entity should change (e.g., method 400 in FIG. 4A). In another example, the indication may be received as a result of an entity state being changed in an entity web.

At determination 424, one or more actions may be determined based on the entity state change. While example operations 426-430 are discussed with respect to method 420, it will be appreciated that any of a variety of other operations may be performed. In some examples, multiple operations may be performed. The determination may comprise evaluating information associated with the entity (e.g., entity attributes, historical entity or state change information, previous entity states etc.), information from a problem domain ontology, user input information, or information associated with the computing environment, among other information. The determination may comprise selecting one or more of operations 426-430. For example, if it is determined that the entity has returned to a good state, operation 426 may be performed so as to generate a state change event that may be evaluated by one or more other transitions. As a result, associated entities may also undergo a state change (e.g., Division A entity 226 and associated organization entity 236 in FIG. 2A).

In another example, if it is determined that the entity has entered a bad or unknown state, operation 428 may be performed so as to take remedial action. A remedial action may comprise restoring the state of the entity from a previous snapshot or backup or performing a malware scan of the entity, among other actions. In some examples, a remedial action performed at operation 428 may be based on determination 424, wherein the action may be based on the evaluation discussed above. For example, if it is determined based on historical entity information that the entity is frequently in a bad state, the remedial action may comprise reimaging the entity so as to reset the entity.

In some examples, operation 430 may be performed to generate a recommendation based on the entity state change indication. The recommendation may comprise one or more actions that may improve the state of the entity. In some examples, generating a recommendation may comprise accessing a data store comprising one or more recommendations. The data store may be accessed using entity information and/or other information in order to identify a relevant recommendation based on the information. In other examples, a recommendation may be dynamically generated based on information evaluated at determination 424. Method 420 terminates at operations 426, 428, and/or 430.

Figure 5:
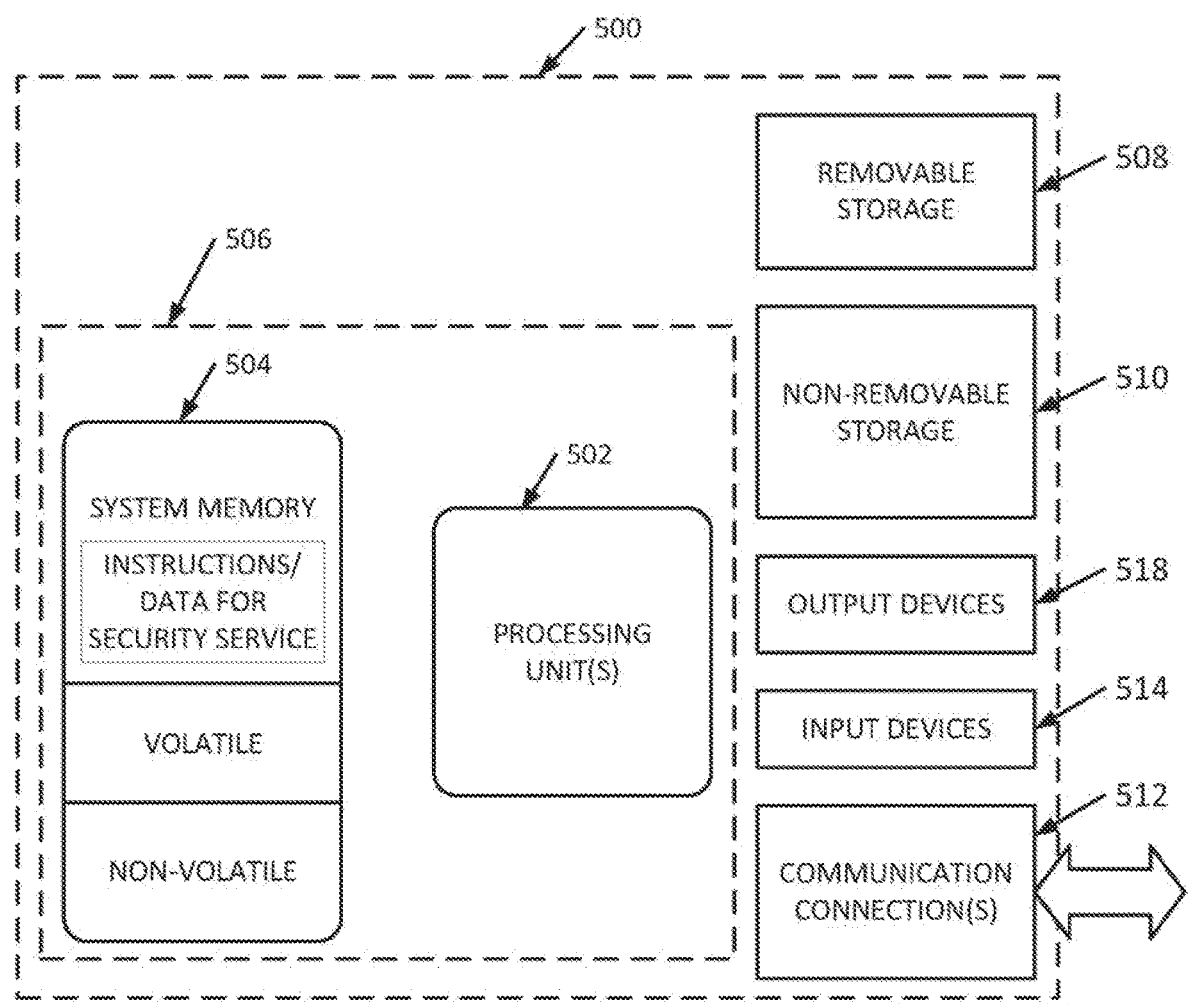
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, entity information, entity state information, one or more PT networks, PT network transition information, instructions to perform the methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a system comprising: at least one processor; and memory storing instructions that, when executed by the at least one processor, causes the system to perform a set of operations. The set of operations comprises: receiving an event associated with an entity; determining a place/transition (PT) network associated with the entity, wherein the entity is associated with a first place of the PT network; identifying a transition of the PT network, wherein the transition is associated with the first place; evaluating the event based on the identified transition to determine whether the entity should transition from the first place to a second place of the PT network; when it is determined that the entity should transition, associating the entity with the second place of the PT network; and performing an action for the entity based on the entity being associated with the second place of the PT network. In an example, the PT network is determined based on evaluating at least one of the event and the entity to identify the PT network. In another example, the transition comprises computer-executable code, and wherein evaluating the event based on the identified transition comprises executing the computer-executable code. In a further example, evaluating the event based on the identified transition comprises an evaluation of at least one of deterministic and stochastic factors. In yet another example, evaluating the event based on the identified transition comprises evaluating the event using machine learning. In a further still example, the PT network comprises: a place associated with a good state for the entity; a place associated with a bad state for the entity; and a place associated with an unknown state for the entity. In an example, performing the action for the entity comprises at least one of: generating a recommendation for the entity, wherein the recommendation is based on the event; performing a remedial action; and modifying a relationship between the entity and another entity within a computing environment of the entity.

In another aspect, the technology relates to a method for state-based behavior analysis of an entity. The method comprises: receiving an event associated with the entity; performing an evaluation of the event based on a transition of a place/transition (PT) network, wherein the transition is associated with a first place of the PT network, and wherein the entity is associated with the first place; determining, based on the evaluation, whether the entity should transition from the first place to a second place of the PT network; when it is determined that the entity should transition, associating the entity with the second place of the PT network; determining an action to perform based on the entity being associated with the second place of the PT network; and performing the determined action. In an example, the event is received via an application programming interface. In another example, determining the action to perform comprises evaluating at least one of the event and the entity. In a further example, the method further comprises: receiving a second event associated with the entity; and evaluating the second event using a second transition associated with the second place of the PT network to determine whether the entity should transition from the second place to another place of the PT network. In yet another example, the transition comprises computer-executable code, and wherein performing the evaluation of the event based on the transition comprises executing the computer-executable code. In a further still example, performing the determined action comprises at least one of: generating a recommendation for the entity, wherein the recommendation is based on the event; performing a remedial action; and modifying a relationship between the entity and another entity within a computing environment of the entity.

In a further aspect, the technology relates to a method for state-based behavior analysis of an entity. The method comprises: receiving an indication of a state change of a first entity; identifying a relationship associated with the first entity; determining whether the relationship should be modified based on the indication of the state change of the first entity; when it is determined that the relationship should be modified, modifying the relationship based on the state change of the first entity; identifying a second entity associated with the first entity by one or more relationships; determining, using a place/transition (PT) network associated with the second entity, whether the second entity should change states based on the indication of the state change of the first entity; when it is determined that the second entity should change states; associating the second entity with an updated state based on the PT network; and performing an action for the first entity based on the indication of the state change for the first entity. In an example, modifying the relationship comprises at least one of: removing the relationship; updating the relationship; and generating a new relationship between the first entity and another entity. In another example, associating the second entity with the updated state further comprises generating a second indication of a state change of the second entity. In a further example, determining whether the second entity should change states comprises an evaluation of at least one of deterministic and stochastic factors. In yet another example, determining whether the second entity should change states comprises an evaluation using machine learning. In a further still example, the PT network comprises: a place associated with a good state for the second entity; a place associated with a bad state for the second entity; and a place associated with an unknown state for the second entity. In an example, performing the action for the first entity comprises at least one of: generating a recommendation for the first entity; performing a remedial action; and generating a recommendation to modify a relationship between the first entity and another entity within a computing environment of the first entity.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer program product comprising a non-transitory computer readable medium storing instructions executable by a processor to perform a set of operations, the set of operations comprising:
receiving an event associated with an entity of a computing environment;
determining a place/transition (PT) network associated with the entity, the PT network comprising a first place, a transition, and a second place, wherein the entity is associated with the first place of the PT network and the transition comprises computer-executable code to determine whether to transition the entity from the first place to the second place of the PT network;
identifying the transition of the PT network;
evaluating the event using the computer-executable code of the transition to determine whether the entity should transition from the first place to the second place of the PT network;
when it is determined that the entity should transition from the first place to the second place, associating the entity with the second place of the PT network; and
performing an action for the entity based on the entity being associated with the second place of the PT network.

2. The computer program product of claim 1, wherein the PT network is determined based on evaluating at least one of the event and the entity to identify the PT network.

3. The computer program product of claim 1, wherein the transition comprises computer-executable code, and wherein evaluating the event comprises executing the computer-executable code.

4. The computer program product of claim 1, wherein evaluating the event using the computer-executable code further comprises evaluating additional information associated with the entity.

5. The computer program product of claim 1, wherein evaluating the event using the computer-executable code further comprises evaluating the event using machine learning.

6. The computer program product of claim 1, wherein the PT network comprises:
a place associated with a good state for the entity;
a place associated with a bad state for the entity; and
a place associated with an unknown state for the entity.

7. The computer program product of claim 1, wherein performing the action for the entity comprises at least one of:
generating a recommendation for the entity, wherein the recommendation is based on the event;
performing a remedial action; and
modifying a relationship between the entity and another entity within the computing environment.

8. A computer program product comprising a non-transitory computer readable medium storing instructions executable by a processor to perform a set of operations, the set of operations comprising:
receiving an indication of an event associated with an entity in a computing environment;
executing computer-executable code of a transition in a place/transition (PT) network, to determine, based on the event, whether the entity should transition from a first place to a second place of the PT network;
when it is determined that the entity should transition from the first place to the second place, associating the entity with the second place of the PT network;
determining an action to perform based on the entity being associated with the second place of the PT network; and
performing the determined action.

9. The computer program product of claim 8, wherein the indication of the event is received via an application programming interface.

10. The computer program product of claim 8, wherein determining the action to perform comprises evaluating at least one of the event and the entity.

11. The computer program product of claim 8, wherein the set of operations further comprise:
receiving an indication of a second event associated with the entity; and
executing computer-executable code of a second transition associated with the second place of the PT network to determine whether the entity should transition from the second place to another place of the PT network.

12. The computer program product of claim 8, wherein determining whether the entity should transition from the first place to the second place further comprises evaluating additional information associated with the entity.

13. The computer program product of claim 8, wherein performing the determined action comprises at least one of:
generating a recommendation for the entity, wherein the recommendation is based on the event;
performing a remedial action; and
modifying a relationship between the entity and another entity within the computing environment.

14. A computer program product comprising a non-transitory computer readable medium storing instructions executable by a processor to perform a set of operations, the set of operations comprising:
receiving an indication of a state change of a first entity;
identifying a relationship associated with the first entity;
determining whether the relationship should be modified based on the indication of the state change of the first entity;
when it is determined that the relationship should be modified, modifying the relationship based on the state change of the first entity;
identifying a second entity associated with the first entity by one or more relationships;
determining, using a place/transition (PT) network associated with the second entity, whether the second entity should change states based on the indication of the state change of the first entity;
when it is determined that the second entity should change states, associating the second entity with an updated state based on the PT network; and
performing an action for the first entity based on the indication of the state change for the first entity.

15. The computer program product 14, wherein modifying the relationship comprises at least one of:
removing the relationship;
updating the relationship; and
generating a new relationship between the first entity and another entity.

16. The computer program product 14, wherein associating the second entity with the updated state further comprises generating a second indication of a state change of the second entity.

17. The computer program product 14, wherein determining whether the second entity should change states comprises an evaluation of at least one of deterministic and stochastic factors.

18. The computer program product 14, wherein determining whether the second entity should change states comprises an evaluation using machine learning.

19. The computer program product 14, wherein the PT network comprises:
- a place associated with a good state for the second entity;
- a place associated with a bad state for the second entity; and
- a place associated with an unknown state for the second entity.

20. The computer program product 14, wherein performing the action for the first entity comprises at least one of:
- generating a recommendation for the first entity;
- performing a remedial action; and
- generating a recommendation to modify a relationship between the first entity and another entity within a computing environment of the first entity.

* * * * *